(12) United States Patent
Naraki et al.

(10) Patent No.: US 11,897,976 B2
(45) Date of Patent: Feb. 13, 2024

(54) PROCESS FOR PRODUCING POLYETHYLENE

(71) Applicant: Sumitomo Chemical Company, Limited, Tokyo (JP)

(72) Inventors: Kensuke Naraki, Ichihara (JP); Toshihiko Manami, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 85 days.

(21) Appl. No.: 17/702,957

(22) Filed: Mar. 24, 2022

(65) Prior Publication Data

US 2022/0325007 A1 Oct. 13, 2022

(30) Foreign Application Priority Data

Mar. 31, 2021 (JP) .................................. 2021-060394

(51) Int. Cl.
*C08F 2/01* (2006.01)
*C08F 110/02* (2006.01)

(52) U.S. Cl.
CPC .............. *C08F 2/01* (2013.01); *C08F 110/02* (2013.01)

(58) Field of Classification Search
CPC .................................. C08F 2/001; C08F 10/02
See application file for complete search history.

(56) References Cited

U.S. PATENT DOCUMENTS

| | | | | |
|---|---|---|---|---|
| 4,123,600 A * | 10/1978 | Kita | ........................ | B01J 19/245 526/352.2 |
| 4,271,280 A | 6/1981 | Tomura et al. | | |
| 9,174,183 B2 * | 11/2015 | Wu | ............................ | B01J 8/24 |
| 11,396,562 B2 * | 7/2022 | Dotti | ...................... | C08F 110/02 |
| 2002/0146582 A1 | 10/2002 | Tsutsumi et al. | | |
| 2003/0207139 A1 | 11/2003 | Tsutsumi et al. | | |

FOREIGN PATENT DOCUMENTS

| | | |
|---|---|---|
| JP | S5019599 B1 | 7/1975 |
| JP | S5415905 B2 | 6/1979 |
| JP | S5938961 B2 | 9/1984 |
| JP | 200260426 A | 2/2002 |
| JP | 2003342307 A | 12/2003 |
| JP | 201260426 A | 3/2012 |

* cited by examiner

*Primary Examiner* — Caixia Lu
(74) *Attorney, Agent, or Firm* — Panitch Schwarze Belisario & Nadel LLP

(57) ABSTRACT

A process or apparatus for producing polyethylene with improved film thinning and handleability involves polymerizing high-pressure ethylene using an autoclave-type reactor in the presence of a polymerization initiator. The reaction zone of the reactor has at least two different temperature sections; the polymerization initiator and the ethylene are supplied to the upstream temperature section in the reaction zone and the ethylene is polymerized to generate polyethylene; unreacted ethylene and the polyethylene generated at the upstream temperature section in the reactor flow into the downstream temperature section in communication with the upstream temperature section, so that additional polyethylene is generated at the downstream temperature section. A difference ($\Delta T$ [° C.]) between a temperature ($T1$ [° C.]) of the temperature section positioned upstream and a temperature ($T2$ [° C.]) of the temperature section positioned downstream in the reaction zone that receives the polymerization initiator and is in the autoclave-type reactor is 2.1° C. to 8.4° C.

4 Claims, 6 Drawing Sheets

PROCESS FOR PRODUCING POLYETHYLENE

CROSS-REFERENCE TO RELATED APPLICATION

This application claims priority under 35 U.S.C. § 119(b) to Japanese Application No. 2021-060394 filed on Mar. 31, 2021, the disclosure of which is incorporated herein by reference in its entirety.

BACKGROUND OF THE INVENTION

Field of the Invention

The present invention relates to a process or apparatus for producing polyethylene.

Description of the Related Art

Polyethylene is processed and utilized as a wide variety of films such as heavy bags, shrink bags, general packaging, thin films, protective films, extrusion laminated films, extrusion molded films, and foam molded films. Among them, low-density polyethylene (LDPE) produced by a high-pressure radical polymerization process, in particular, is processed and used as an extrusion laminated film or a protective film. The protective film is laminated (attached) onto an optical material or a metal plate to protect the optical material or the metal plate. For example, the protective film may be used to protect a film-like etching resist (dry film resist (DFR)) used for the formation of a circuit on a substrate. During manufacture of such a film, film thinning and handleability of polyethylene should be well balanced.

JP-A-2012-60426 discloses a DFR-use protective file composed of a polyethylene film obtained by a high-pressure radical polymerization process and a DFR-use protective film composed of a polyethylene film in which fisheye abundance is within a specific range.

SUMMARY OF THE INVENTION

In view of such a situation, the present invention addresses the problem of providing a process or apparatus for producing polyethylene with further improved film thinning and handleability.

The present inventors have conducted intensive research in light of such a background. Then, the present invention has been completed.

Specifically, the present invention provides the following items.

[1] A process for producing polyethylene, comprising subjecting high-pressure ethylene to polymerization using a autoclave-type reactor in presence of a polymerization initiator, wherein the autoclave-type reactor has a reaction zone with at least two different temperature sections;

the polymerization initiator and the ethylene are supplied to the temperature section positioned upstream in the reaction zone of the autoclave-type reactor and the ethylene is polymerized to generate polyethylene;

unreacted ethylene and the polyethylene generated at the upstream temperature section in the autoclave-type reactor flow into the temperature section positioned downstream and in communication with the upstream temperature section in the reaction zone of the reactor, so that additional polyethylene is generated at the downstream temperature section; and a difference ($\Delta T$ [° C.]) between a temperature (T1 [° C.]) of the temperature section positioned upstream and a temperature (T2 [° C.]) of the temperature section positioned downstream in the reaction zone that receives the polymerization initiator and is in the autoclave-type reactor is 2.1° C. or more and 8.4° C. or less.

The following respective [2] to [8] are preferable forms or embodiments of the invention.

[2] The production process according to [1], wherein two or more reaction zones are present.

[3] The production process according to [1] or [2], wherein $\Delta T$ [° C.]=T2 [° C.]−T1 [° C.].

[4] The production process according to any one of [1] to [3], wherein the polyethylene to be produced is the following polyethylene having a ratio ($W_{Log\ 10M>5.25}/R_{LS}$) of a weight fraction ($W_{Log\ 10M>5.25}$: represented in wt %) of a component with $Log_{10}$ M of more than 5.25 in an integral distribution curve of polyethylene evaluated by gel permeation chromatography, where M represents a molecular weight in terms of polyethylene, to a light scattering area ratio ($R_{LS}$) of 5.7 or more and 6.7 or less, the light scattering area ratio represented by the following formula 1:

$$R_{LS}=LS/LS' \quad \text{(formula 1)}$$

wherein LS denotes a light scattering area of a solution prepared by dissolving 40 mg of the polyethylene into 20 mL of o-dichlorobenzene, and LS' denotes a light scattering area of a solution prepared by dissolving 40 mg of standard polystyrene with a number average molecular weight of 1000 into 20 mL of o-dichlorobenzene.

[5] An apparatus for producing polyethylene, comprising a unit configured to polymerize high-pressure ethylene by using a autoclave-type reactor in presence of a polymerization initiator, wherein the autoclave-type reactor has a reaction zone with at least two different temperature sections;

the polymerization initiator and the ethylene are supplied to the temperature section positioned upstream in the reaction zone of the autoclave-type reactor and the ethylene is polymerized to generate polyethylene;

unreacted ethylene and the polyethylene generated at the upstream temperature section in the autoclave-type reactor flow into the temperature section positioned downstream and in communication with the upstream temperature section in the reaction zone of the reactor, so that additional polyethylene is generated at the downstream temperature section; and a difference ($\Delta T$ [° C.]) between a temperature (T1 [° C.]) of the temperature section positioned upstream and a temperature (T2 [° C.]) of the temperature section positioned downstream in the reaction zone that receives the polymerization initiator and is in the autoclave-type reactor is 2.1° C. or more and 8.4° C. or less.

[6] The production apparatus according to [5], wherein two or more reaction zones are present.

[7] The production apparatus according to [5] or [6], wherein $\Delta T$ [° C.]=T2 [° C.]−T1 [° C.].

[8] The production apparatus according to any one of [5] to [7], wherein the polyethylene to be produced is the following polyethylene:

having a ratio ($W_{Log\ 10M>5.25}/R_{LS}$) of a weight fraction ($W_{Log\ 10M>5.25}$:represented in wt %) of a component with $Log_{10}$ M of more than 5.25 in an integral distribution curve of polyethylene evaluated by gel permeation chromatography, where M represents a molecular weight in terms of polyethylene, to a light scattering area ratio ($R_{LS}$) of 5.7 or more and 6.7 or less, the light scattering area ratio represented by the following formula 1:

$$R_{LS}=LS/LS'  \quad\text{(formula 1)}$$

wherein LS denotes a light scattering area of a solution prepared by dissolving 40 mg of the polyethylene into 20 mL of o-dichlorobenzene, and LS' denotes a light scattering area of a solution prepared by dissolving 40 mg of standard polystyrene with a number average molecular weight of 1000 into 20 mL of o-dichlorobenzene.

According to the invention, the pressure inside the reactor and the temperature difference in the reaction zone inside the reactor are suitably controlled. This makes it possible to produce polyethylene with further improved film thinning and handleability. It has been found that the ratio of the amount of ultra-high molecular weight component to the amount of medium to high molecular weight component of polyethylene depends on the balance between the stretch property and the haze. Then, the balance between the stretch property and the haze is further improved by setting the ratio to a specific range. This allows for production of polyethylene with further improved film thinning and handleability. The film thinning can be evaluated as the stretch property of polyethylene. The handleability can be evaluated as the roughness of a film surface, for instance, the haze of a film.

DETAILED DESCRIPTION OF THE PREFERRED EMBODIMENTS

<Process for Producing Polyethylene>

Figure 1:
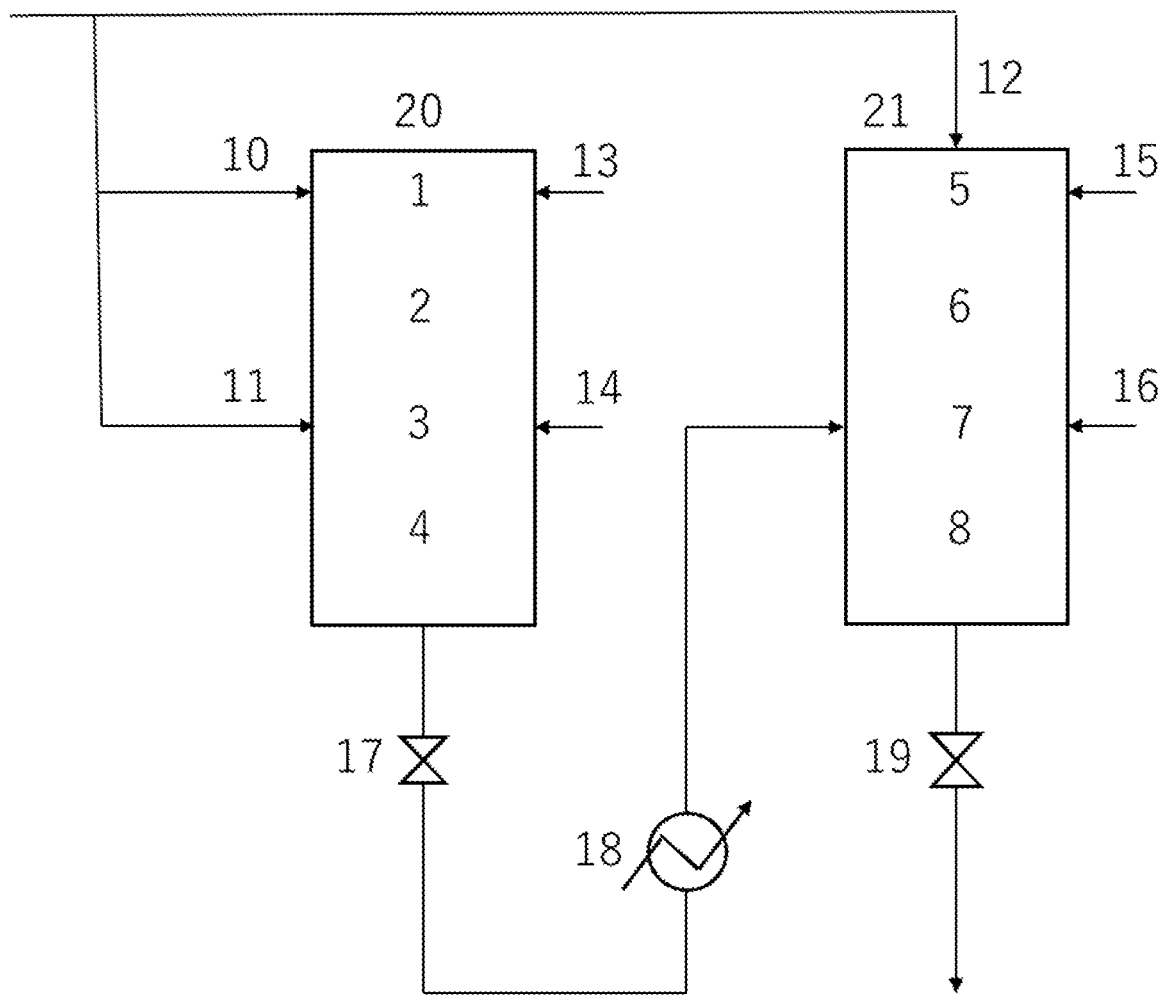
FIG. 1 is a schematic process diagram illustrating how to produce polyethylene according to an embodiment of the invention.

A process for producing polyethylene according to the invention is as follows:

a process for producing polyethylene, comprising subjecting high-pressure ethylene to polymerization using a autoclave-type reactor in presence of a polymerization initiator, wherein the autoclave-type reactor has a reaction zone with at least two different temperature sections;

the polymerization initiator and the ethylene are supplied to the temperature section positioned upstream in the reaction zone of the autoclave-type reactor and the ethylene is polymerized to generate polyethylene;

unreacted ethylene and the polyethylene generated at the upstream temperature section in the autoclave-type reactor flow into the temperature section positioned downstream and in communication with the upstream temperature section in the reaction zone of the reactor, so that additional polyethylene is generated at the downstream temperature section; and a difference (ΔT [° C.]) between a temperature (T1 [° C.]) of the temperature section positioned upstream and a temperature (T2 [° C.]) of the temperature section positioned downstream in the reaction zone that receives the polymerization initiator and is in the autoclave-type reactor is 2.1° C. or more and 8.4° C. or less.

The pressure of ethylene used in the invention can be, for example, from 100 to 280 MPa and preferably from 100 to 250 MPa. The pressure is more preferably from 156 to 174 MPa. Below the preferable range, the light scattering area (described below) and the weight fraction of the component having $Log_{10}$ M of more than 5.25 (described below) increase. This causes the haze to increase and the melt stretch property to decrease. In addition, when the pressure exceeds the preferable range, the light scattering area and the weight fraction of the component having $Log_{10}$ M of more than 5.25 decrease. This causes the haze to decrease and the melt stretch property to increase.

Examples of the polymerization initiator used in the invention include, but are not particularly limited to, diisopropyl peroxydicarbonate, di-2-ethylhexyl peroxydicarbonate, tertiary-butyl peroxypivalate, 3,5,5-trimethylhexanoyl peroxide, octanoyl peroxide, decanoyl peroxide, lauroyl peroxide, propionyl peroxide, tertiary-butylperoxy-2-ethylhexanoate (t-butylperoxy-2-ethylhexanoate), tertiary-butyl peroxyisobutyrate, tertiary-butyl peroxylaurate, tertiary-butyl peroxyisopropyl carbonate, tertiary-butyl peroxyacetate, tertiary-butyl peroxybenzoate, dicumyl peroxide, tertiary-butyl hydroperoxide, or tertiary-butyl peroxide.

The reactor used in the invention is a autoclave-type reactor. The number of reactors used in the invention is not particularly limited, and for example, two reactors, three reactors, or four or more reactors may also be used. When two reactors are used, the two reactors may be referred to as a first reactor and a second reactor, respectively.

The reactor used in the invention includes a reaction zone with at least two different temperature sections. The reaction zone may have three different temperature sections, four different temperature sections, or five or more different temperature sections. The reactor may include two or more reaction zones such as two reaction zones, three reaction zones, or four or more reaction zones. The reaction zone may be called a reaction area.

The polymerization initiator and the ethylene are supplied to the temperature section positioned upstream in the reaction zone of the autoclave-type reactor and the ethylene is polymerized to generate polyethylene. Unreacted ethylene and the polyethylene generated at the upstream temperature section in the reactor flow into the temperature section positioned downstream and in communication with the upstream temperature section in the reaction zone of the reactor, so that additional polyethylene is generated at the downstream temperature section. When the reactor is a vertical reactor (e.g., a autoclave-type reactor), the upstream part and the downstream part may be referred to as an upper portion and a lower portion, respectively.

The difference ($\Delta T$ [° C.]) between the temperature (T1 [° C.]) of the temperature section positioned upstream and the temperature (T2 [° C.]) of the temperature section positioned downstream in the reaction zone that receives the polymerization initiator and is in the autoclave-type reactor is 2.1° C. or more and 8.4° C. or less. Preferably, $\Delta T$ [° C.] is 2.2° C. or more and 8.0° C. or less. Preferably, $\Delta T$ [° C.]=T2 [° C.]–T1 [° C.].

When $\Delta T$ [° C.] is 8.4 or more or 2.1 or less, the weight fraction of the component having $Log_{10}$ M of more than 5.25 increases, and the melt stretch property decreases.

<Apparatus for Producing Polyethylene>

An apparatus for producing polyethylene according to the invention has substantially the same features as of the process for producing polyethylene according to the invention.

<Specific Examples of Production Process or Production Apparatus>

The reaction device and the reaction conditions for the polyethylene production process or apparatus in the invention are not particularly limited. Examples include a production process having, for instance, the following reaction device and reaction conditions.

In the process, high-temperature and high-pressure ethylene is injected using a composite reactor in which two or more autoclave-type reactors are connected in series using piping with a heat exchanger; the reaction mixture discharged from a first autoclave-type reactor is cooled with the heat exchanger; and the cooled reaction mixture is re-injected into a second autoclave-type reactor. Here, majority of the fresh ethylene is injected into an upper reaction zone of the first autoclave-type reactor with the upper reaction zone and a lower reaction zone; the rest fresh ethylene is injected into an upper reaction zone of the second autoclave-type reactor with the upper reaction zone and a lower reaction zone; the fresh ethylene injected into the upper reaction zone of the first autoclave-type reactor is polymerized at a temperature of 130 to 2000 and a pressure of 100 to 280 MPa in the presence of a polymerization initiator; the resulting reaction mixture is guided to the lower reaction zone of the first autoclave-type reactor and polymerized at a temperature of 220 to 280° C. in the presence of the polymerization initiator; the reaction mixture discharged from an end port of the first autoclave-type reactor passes through the heat exchanger disposed between the first autoclave-type reactor and the second autoclave-type reactor, and is thus cooled to 120° C. or higher, but a temperature 20° C. or more lower than the reaction temperature at the lower reaction zone of the first autoclave-type reactor; the reaction mixture is then injected into the second autoclave-type reactor, and is polymerized at a temperature of 130 to 200° and a pressure of 100 to 280 MPa in the presence of the polymerization initiator in the upper reaction zone of the second autoclave-type reactor; the resulting reaction mixture is guided to the lower reaction zone of the second autoclave-type reactor and polymerized at a temperature of 220 to 280° C. in the presence of the polymerization initiator.

When the process of the invention is implemented, the number of injection points of the fresh ethylene or the polymerization initiator injected into the upper reaction zone of the first and/or second autoclave-type reactor(s) may be 2 or more along the length-wise direction of the reactors. Note that the polymerization initiator may be injected from the same injection point as of the fresh ethylene, or may be injected from an injection point different from that of the fresh ethylene. Various combinations of the positions of the injection points of the fresh ethylene and the polymerization initiator injected into the upper reaction zone are conceivable, but the combination of the optimum positions can be appropriately determined by those skilled in the art.

In the invention, majority of fresh ethylene may be injected, for example, into the upper reaction zone of the first autoclave-type reactor. The majority of fresh ethylene means 60% or more of all the fresh ethylene.

The reaction pressure of ethylene may be, for example, from 100 to 280 MPa and preferably from 100 to 250 MPa. The reaction pressure in the invention will be described. For example, a value obtained by subtracting a pressure loss in piping leading to the second autoclave-type reactor from a reaction pressure in the first autoclave-type reactor is the maximum value of the pressure in the second autoclave-type reactor. Within this range, the pressure can be optionally adjusted using a pressure control valve at the outlet of the first autoclave-type reactor.

The reaction temperature in the invention will be described. For example, the reaction temperature may be, for example, from 130 to 250° C. and preferably from 140 to 250° C. in the upper reaction zone of the first or second autoclave-type reactor. In the lower reaction zone, the reaction temperature may be, for example, from 200 to 280° C. and preferably from 200 to 270° C. For instance, the reaction temperature at the upper reaction zone may be different between the first autoclave-type reactor and the second autoclave-type reactor. The same applies to the lower reaction zone.

For example, the polymerization initiator used in the upper reaction zone in the first or second autoclave-type reactor is preferably a polymerization initiator having a decomposition temperature of 40 to 80° C. and a half-life of 10 h. Specific examples thereof include diisopropyl peroxydicarbonate, di-2-ethylhexyl peroxydicarbonate, tertiary-butyl peroxypivalate, 3,5,5-trimethylhexanoyl peroxide, octanoyl peroxide, decanoyl peroxide, lauroyl peroxide, propionyl peroxide, tertiary-butyl peroxy-2-ethylhexanoate (t-butyl peroxy-2-ethylhexanoate), or tertiary-butyl peroxyisobutylate.

For example, the amount of the polymerization initiator used for polymerization of ethylene in the upper reaction zones of the first and second autoclave-type reactors can be from 50 to 1000 parts by weight based on 1000000 parts by weight of ethylene.

For example, the polymerization initiator used in the lower reaction zone in the first or second autoclave-type reactor is preferably a polymerization initiator having a decomposition temperature of 70 to 140° C. and a half-life of 10 h. Specific examples thereof include tertiary-butylperoxy-2-ethylhexanoate (t-butylperoxy-2-ethylhexanoate), tertiary-butylperoxyisobutyrate, tertiary-butylperoxylaurate, tertiary-butylperoxyisopropyl carbonate, tertiary-butylperoxyacetate, tertiary-butylperoxybenzoate, dicumyl peroxide, tertiary-butyl hydroperoxide, or tertiary-butyl peroxide.

For example, the amount of the polymerization initiator used for polymerization of ethylene in the lower reaction zones of the first and second autoclave-type reactors can be from 5 to 500 parts by weight based on 1000000 parts by weight of ethylene.

For example, the polymerization initiator used at a part of the reaction zone or the lower reaction zone of the first or second autoclave-type reactor in the invention may be made of one kind or a mixture of two or more kinds.

The fresh ethylene gas in the invention may contain, for example, 0.1 to 10 mol % of a chain transfer agent based on the weight of ethylene.

Examples of the chain transfer agent include a paraffin compound (e.g., ethane, propane, butane, pentane, hexane, heptane), an α-olefin compound (e.g., propylene, butene-1, hexene-1, 3-methylpentene-1), an aldehyde compound (e.g., formaldehyde, acetaldehyde, propionaldehyde), a ketone compound (e.g., acetone, methyl ethyl ketone, diethyl ketone, cyclohexanone), or an aromatic hydrocarbon (e.g., benzene, toluene, xylene). One kind or a mixture of two or more kinds thereof may be used.

Figure 2:
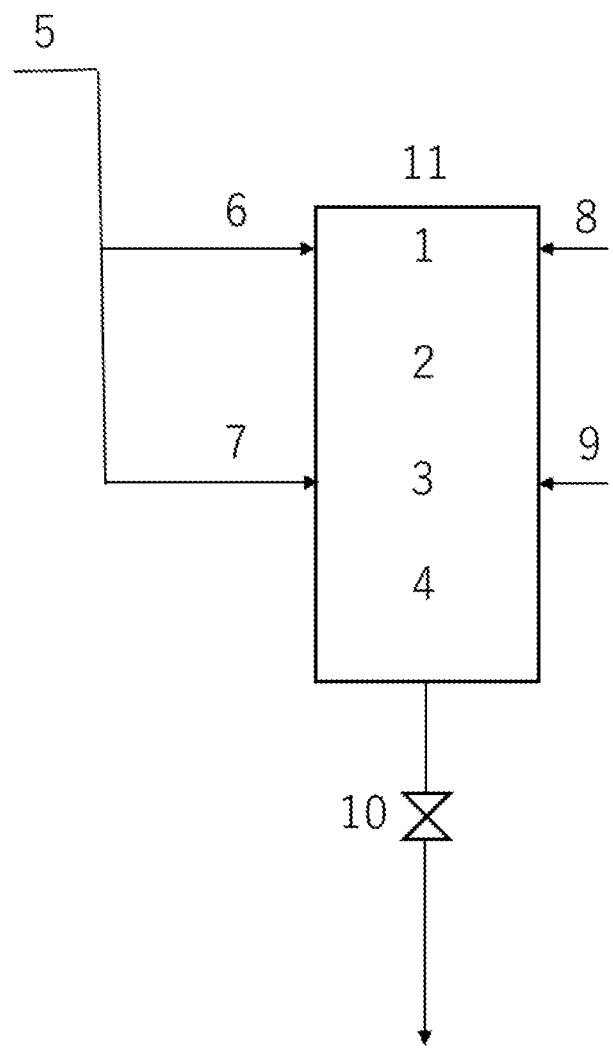
FIG. 2 is a schematic process diagram illustrating how to produce polyethylene according to another embodiment of the invention.
Figure 3:
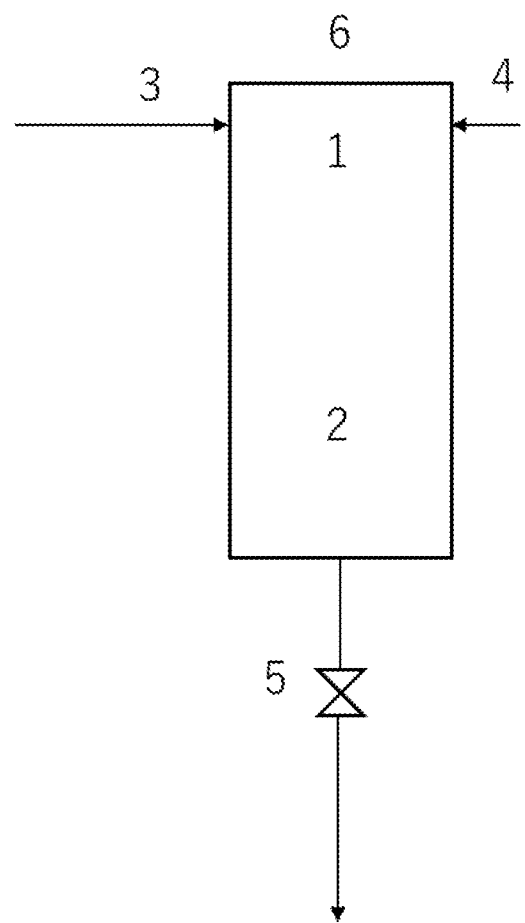
FIG. 3 is a schematic process diagram illustrating how to produce polyethylene according to another embodiment of the invention.
Figure 4:
FIG. 4 shows a relationship between the haze and the melt stretch property (minimum thickness) of each polyethylene film produced in Examples or Comparative Examples in the invention.

Specific Examples of Implementation in FIG. 1, 2, or 3

In the implementation in FIG. 1 (Examples 1 to 3), the implementation in FIG. 2 (Examples 4 and 5), and the implementation in FIG. 3, for example, the following conditions may be adopted.

In the implementation in FIG. 1:

the discharge pressure (piping 9) of a secondary compressor may be, for example, from 100 to 300 MPa and preferably from 150 to 250 MPa;

the fresh ethylene total amount (piping 9) may be, for example, from 5 to 30 ton/h and preferably from 10 to 20 ton/h;

the fresh ethylene supply amount (piping 10) at an upper portion of a autoclave-type reactor 20 may be, for example, from 1 to 15 ton/h and preferably from 3 to 10 ton/h;

the fresh ethylene supply amount (piping 11) at a lower portion of the autoclave-type reactor 20 may be, for example, from 1 to 20 ton/h and preferably from 5 to 10 ton/h;

the fresh ethylene supply amount (piping 12) at an upper portion of a autoclave-type reactor 21 may be, for example, from 1 to 15 ton/h and preferably from 3 to 10 ton/h;

the polymerization initiator supply amount (piping 13) at an upper portion of the autoclave-type reactor 20 may be, for example, from 1 to 10 kg/h and preferably from 2 to 8 kg/h;

the polymerization initiator supply amount (piping 14) at a lower portion of the autoclave-type reactor 20 may be, for example, from 1 to 10 kg/h and preferably from 2 to 8 kg/h;

the polymerization initiator supply amount (piping 15) at an upper portion of the autoclave-type reactor 21 may be, for example, from 1 to 10 kg/h and preferably from 1 to 8 kg/h; and the polymerization initiator supply amount (piping 16) at a lower portion of the autoclave-type reactor 21 may be, for example, from 0 to 10 kg/h and preferably from 0 to 8 kg/h.

In the implementation in FIG. 2:

the discharge pressure (piping 5) of a secondary compressor may be, for example, from 100 to 300 MPa and preferably from 150 to 250 MPa;

the fresh ethylene total amount (fresh ethylene gas rate) (piping 5) may be, for example, from 5 to 30 ton/h and preferably from 10 to 20 ton/h;

the fresh ethylene supply amount (piping 6) at an upper portion of a autoclave-type reactor 11 may be, for example, from 1 to 15 ton/h and preferably from 3 to 10 ton/h;

the fresh ethylene supply amount (piping 7) at a lower portion of the autoclave-type reactor 11 may be, for example, from 1 to 20 ton/h and preferably from 5 to 10 ton/h;

the polymerization initiator supply amount (piping 8) at an upper portion of the autoclave-type reactor 11 may be, for example, from 1 to 10 kg/h and preferably from 2 to 8 kg/h; and the polymerization initiator supply amount (piping 9) at a lower portion of the autoclave-type reactor 11 may be, for example, from 1 to 10 kg/h and preferably from 1 to 8 kg/h.

In the implementation in FIG. 3:

a temperature section 1 of a autoclave-type reactor 6 may be provided via piping 3 with fresh ethylene at a total amount (e.g., from 5 to 30 ton/h, preferably from 10 to 20 ton/h, and more preferably from 14.0 to 18.0 ton/h) of fresh ethylene compressed, by a secondary compressor, in the range of discharge pressure (e.g., from 100 to 300 MPa, preferably from 150 to 250 MPa, and more preferably from 160 to 220 MPa);

the pressure of the autoclave-type reactor 6 may be from 155 to 215 MPa;

there may be two temperature sections inside the autoclave-type reactor 6, and from the top, temperature sections 1 and 2 may be present and each temperature section may have a thermometer inserted;

the temperature section 1 in the autoclave-type reactor 6 may be supplied via piping 4 with a polymerization initiator (e.g., t-butylperoxy-2-ethylhexanoate) at, for instance, 1 to 10 kg/h, preferably 1 to 8 kg/h, and more preferably 3.0 to 6.0 kg/h;

the fresh ethylene supplied from the piping 3 and the polymerization initiator (e.g., t-butylperoxy-2-ethylhexanoate) supplied from the piping 4 to the temperature section 1 of the autoclave-type reactor 6 may be used for polymerization of the ethylene to produce polyethylene;

the polyethylene produced in the temperature section 1 and unreacted ethylene may be transferred to the temperature section 2, so that the ethylene polymerization continues to further produce polyethylene; and the polyethylene produced and unreacted ethylene in the temperature section 2 of the autoclave-type reactor 6 may be discharged from the bottom of the autoclave-type reactor 6, pass through a pressure control valve 5, and introduced into a heat exchanger and a separator, so that the produced polyethylene and unreacted ethylene are separated through the separator. Finally, the produced ethylene can thus be obtained.

<Polyethylene Produced>

Polyethylene produced using a production process or apparatus of the invention is low-density polyethylene obtained by a high-pressure procedure.

The melt flow rate (MFR, unit: g/10 min) of the polyethylene produced in the invention is not particularly limited. In the protocol defined in JIS K 7210-1995, the melt flow rate measured by Method A under the conditions at a load of 21.18 N and a temperature of 190° C. is preferably from 0.3 to 30 (g/10 min), more preferably from 1 to 10, and still more preferably from 2 to 6. In the case of low MFR, film thinning may be difficult, and in the case of high MFR, stable film formation may be difficult.

The density (unit: $kg/m^3$) of the polyethylene produced in the invention is not particularly limited, and is preferably from 910 to 930 $kg/m^3$, more preferably from 918 to 930 $kg/m^3$, and still more preferably from 920 to 928 $kg/m^3$. When the density is less than 910 $kg/m^3$, the rigidity of the film may be reduced, and the workability may be excessively deteriorated. In the case of more than 930 $kg/m^3$, the flexibility of the film may be reduced. As a result, when the film is used as a protective film, a problem of film adhesion may arise.

Polyethylene produced in the invention is applicable to a wide variety of films such as heavy bags, shrink bags, general packaging, thin films, protective films (protection films), extrusion laminated films, extrusion molded films, and foam molded films. Among them, an extrusion laminated film or a protective film is preferably used, and a protective film is particularly preferably used.

As a film formation method for producing a film (e.g., a protective film) from polyethylene produced in the invention, a known film formation method can be employed. For example, in film formation, any film formation method such as an inflation method (air cooling method, water cooling method) or a T-die method may be used. In addition, stretching treatment such as uniaxial stretching or biaxial stretching can be optionally added. The formation temperature and the take-up speed during film formation are not particularly limited, but generally, a formation temperature of about 130 to 230° C. and a take-up speed of about 5 to 150 m/min are suitable. The film thickness is selected, if appropriate, and the thickness of a film (protective film or the like) is generally preferably from about 5 to 100 μm and more preferably from 10 to 60 μm. The thickness is still more preferably from 12 to 25 μm. Note that the polyethylene produced in the invention may be blended with a polyolefin-based resin such as linear low-density polyethylene, high-density polyethylene, an ethylene-propylene copolymer, or an ethylene-butene copolymer as long as the effect of the invention is exerted. In addition, an additive(s) usually used for polyolefin, specifically, an antioxidant, an antiblocking agent, a lubricant, an antistatic agent, a UV absorber, and/or the like may be added as necessary. Note that polyethylene may be produced by allowing a radical polymerization inhibitor to coexist in a polymerization reaction system. In this case, a certain amount of the radical polymerization inhibitor present in the reaction system remains in the product. The remaining radical polymerization inhibitor may also have an anti-oxidation capacity and the concentration thereof may be sufficient. In this case, any antioxidant, in particular, is not necessarily added to the product polyethylene.

The polyethylene produced in the invention is, for example the following polyethylene:

having a ratio ($W_{Log\ 10M>5.25}/R_{LS}$) of a weight fraction ($W_{Log\ 10M>5.25}$:represented in wt %) of a component with $Log_{10}$ M of more than 5.25 in an integral distribution curve of polyethylene evaluated by gel permeation chromatography, where M represents a molecular weight in terms of polyethylene, to a light scattering area ratio ($R_{LS}$) of 5.7 or more and 6.7 or less, the light scattering area ratio represented by the following formula 1:

$$R_{LS}=LS/LS'\qquad\text{(formula 1)}$$

wherein LS denotes a light scattering area of a solution prepared by dissolving 40 mg of the polyethylene into 20 mL of o-dichlorobenzene, and LS' denotes a light scattering area of a solution prepared by dissolving 40 mg of standard polystyrene with a number average molecular weight of 1000 into 20 mL of o-dichlorobenzene.

In a preferable form or embodiment, $W_{Log\ 10M>5.25}/R_{LS}$ is 5.8 or more and 6.6 or less.

The weight fraction ($W_{Log\ 10M>5.25}$: the unit is wt %) of the component having a $Log_{10}$ M of more than 5.25 and the light scattering area ratio ($R_{LS}$) of the polyethylene produced in the invention were measured according to the protocols described below.

<How to Measure Physical Properties of Polyethylene Produced>

The physical properties of polyethylene produced in Examples or Comparative Examples below were measured according to the following protocols.

(1) Melt Flow Rate (MFR; Unit: g/10 min)

In the protocol specified in JIS K 7210-1995, the melt flow rate was measured by Method A under the conditions at a load of 21.18 N and a temperature of 190° C.

(2) Density (Unit: kg/m³)

Annealing according to JIS K 6922-2 was performed, and measurement was then conducted according to Method A of the protocol specified in JIS K7112.

(3) Weight Fraction of Component with $Log_{10}$ M of More than 5.25 ($W_{Log\ 10M>5.25}$, unit: wt %) (M represents a molecular weight in terms of polyethylene)

Figure 5:
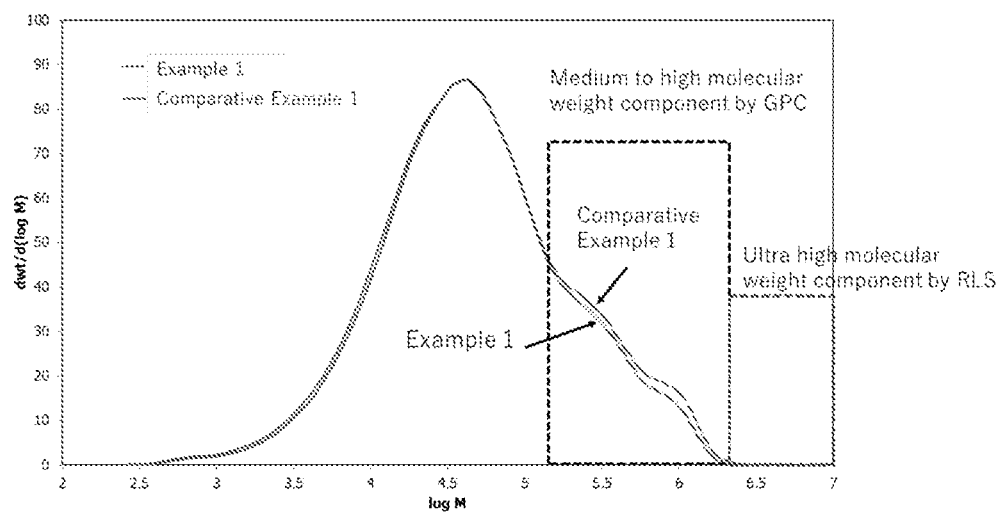
FIG. 5 shows a GPC chromatogram (GPC integral distribution curve) for calculating the weight fraction of high molecular weight component of polyethylene produced in Example 1 or Comparative Example 1.

The molecular weight distribution of polyethylene and each molecular weight in terms of polyethylene (number average molecular weight Mn, weight average molecular weight Mw) are determined by gel permeation chromatography (GPC). GPC measurement is performed under the following conditions. Based on the description of ISO 16014-1, a baseline on the chromatogram is defined and a peak(s) is assigned. The weight fraction of component having a $Log_{10}$ M of more than 5.25 ($W_{Log\ 10M>5.25}$ [wt %]) (M represents a molecular weight in terms of polyethylene) is calculated from the integral distribution (see FIG. 5).

$W_{Log\ 10M>5.25}$ [wt %]=(Integrated value of portion of $Log_{10}$ M>5.25 in an integral distribution curve)/(Integrated value of entire portion of the integral distribution curve).

(GPC Apparatus and Software)

Apparatus: HLC-8321 GPC/HT (manufactured by Tosoh Corporation)

(Measurement Conditions)

GPC column: TSKgel GMHHR-H (S) HT 7.8 mm I.D.× 300 mm (manufactured by Tosch Corporation) 3 columns Mobile phase: o-dichlorobenzene (special grade, manufactured by Wako Pure Chemical Industries, Ltd.), to which dibutylhydroxytoluene (BHT) is added at a concentration of 0.1 w/V, namely 0.1 g/100 mL, is used.

Flow rate: 1 mL/min

Column oven temperature: 140° C.

Autosampler temperature: 140° C.

System oven temperature: 40° C.

Detection: differential refractive index detector (RID)

RID cell temperature: 140° C.

Sample solution injection volume: 300 μL

Standard substance for GPC column calibration: standard polystyrene compounds, manufactured by Tosoh Corporation, are each weighed in the combinations shown in the following table; 5 mL of o-dichlorobenzene (the same composition as of the mobile phase) is added, and the mixture is allowed to stand at room temperature for 120 min for dissolution to prepare a standard substance for GPC column calibration.

TABLE 0

| Combination 1 | F700 0.4 mg | F20 0.9 mg | A5000 1.2 mg |
| Combination 2 | F288 0.4 mg | F10 1.0 mg | A2500 1.2 mg |
| Combination 3 | F80 0.7 mg | F4 1.1 mg | A1000 1.3 mg |
| Combination 4 | F40 0.8 mg | F2 1.1 mg | A500 1.3 mg |

(Sample Solution Preparation Conditions)

Solvent: o-dichlorobenzene (special grade, manufactured by Wako Pure Chemical Industries, Ltd.), to which BHT was added at a concentration of 0.1 w/V (0.1 g/100 mL), was used.

Sample solution concentration: 1 mg/mL
Automatic shaker for dissolution: DF-8020 (manufactured by Tosoh Corporation)
Dissolution conditions: 5 mg of a sample was enclosed in a 1000-mesh metal wire mesh bag made of SUS; the metal wire mesh bag containing the sample was placed in a test tube; 5 mL of solvent was added to the test tube; the test tube was capped with aluminum foil; and the test tube was set in an immersion device and stirred at a stirring rate of 60 reciprocations/min at 140° C. for 120 min.

(4) To Calculate Light Scattering Area Ratio ($R_{LS}$)

A liquid chromatography (LC) apparatus equipped with a light scattering detector was used to measure the light scattering area LS of a solution obtained by dissolving polyethylene of each of Examples or Comparative Examples in o-dichlorobenzene at a concentration of 2 mg/mL and the light scattering area LS' of a solution obtained by dissolving standard polystyrene F10 (with a number average molecular weight: 1000) manufactured by Tosoh Corporation in o-dichlorobenzene at a concentration of 2 mg/mL. Then, the light scattering area ratio was calculated using the following formula:

$$R_{LS}=LS/LS' \quad \text{(formula 1)}$$

The larger the light scattering area ratio ($R_{LS}$), namely the larger the light scattering area LS of a solution obtained by dissolving polyethylene in o-dichlorobenzene, the more the amount of ultra-high molecular weight component in the polyethylene.

The measurement conditions are described below.
LC Apparatus: HLC-8121 GPC/HT (manufactured by Tosoh Corporation)
Light scattering detector: PD 2040 (manufactured by Precision Detectors, Inc.)
Laser light source: wavelength at 685 nm
GPC column: none
Sample solution concentration: 2 mg/mL
Injection volume: 300 μL
Measurement temperature: 140° C.
Dissolution conditions: stirring at 145° C. for 2 h
Automatic shaker for dissolution: DF-8020 (manufactured by Tosoh Corporation)
Solvent and mobile phase: 0.1 w/V BHT-containing o-dichlorobenzene (special grade, manufactured by Wako Pure Chemical Industries, Ltd.)
Mobile phase flow rate: 1.0 mL/min Specifically, the light scattering (LS) detector was connected to the LC apparatus. Note that the scattering angle used for light scattering detection was 90 degrees. The LS detector was placed in a column oven of the LC apparatus.

The sample was dissolved specifically by the following procedure. First, a 30-mL screw vial was charged with 40.0 mg of each sample and 20.0 mL of solvent and sealed. The screw vial was set in DF-8020 (manufactured by Tosoh Corporation). The sample was then dissolved by stirring at 140° C. for 2 h. The sample solution obtained by the above procedure was filtered using a cylindrical filter paper (Whatman cylindrical filter paper with a diameter 18 mm×a length 55 mm; model number: 2800-185) having a pore size of 10 μm before analysis. The filtration was performed at 140° C. or higher in order to avoid precipitation of the sample. The cylindrical filter paper was soaked in the sample solution and was allowed to stand for 5 min while soaked, and then equilibrated. Thereafter, the sample solution soaked into the cylindrical filter paper was subjected to analysis. The filtration was performed within 20 min to avoid a change in concentration of the sample solution due to evaporation of the solvent.

Note that neither GPC columns nor guard columns were used in order to avoid capture of ultra-high molecular weight component by the columns. In addition, in order to acquire a chromatogram, one SUS pipe having an inner diameter of 0.75 mm and a length of 5 m was attached between the sample injection unit and the LS detector. The temperature of the sample injection unit or each detector was set to 140° C.

Figure 6:
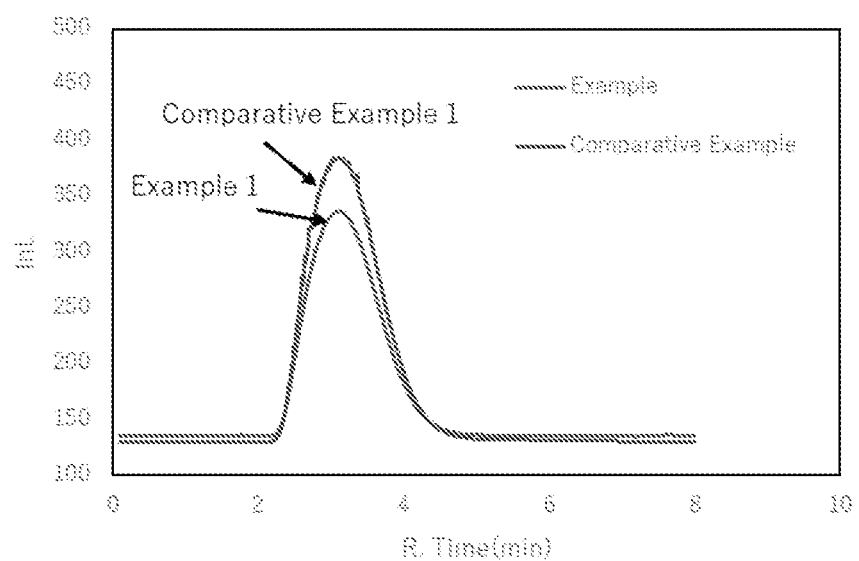
FIG. 6 shows an LS (light scattering detector) chromatogram for measuring the light scattering area of polyethylene produced in Example 1 or Comparative Example 1.

Baseline processing was performed on the obtained LS chromatogram, and the light scattering area was then calculated (see FIG. 6).

The light scattering area was determined using data processing software OmniSEC (version 4.7) from Malvern Inc.

(5) To Evaluate Film Formation of Polyethylene

An inflation film is formed under the following processing conditions. The take-up speed is increased stepwise until the bubbles are broken during the formation processing. The thickness and haze of the film formed at a take-up speed lower by 0.5 m/min than the take-up speed at which the film is broken are measured.

Processing device: EX-50 manufactured by PLACO CO., LTD.
Screw diameter: 50 mmφ
L/D: 28
Die diameter: 125 mmφ
Lip gap: 2.0 mm
Preset temperature: 150° C.
BUR: 2.0
Take-up speed: 12 m/min to 90 m/min
Discharge amount: 23 kg/h
Take-up machine: IFA-600 manufactured by TOMI MACHINERY Co., Ltd.

The sample is held at a constant take-up speed for 5 min. When bubble disconnection does not occur, the take-up speed is increased by 0.5 m/min. When the bubbles are broken, the fracture portion is sampled. When a fisheye (FE) nucleus is visually observed around the fracture portion, it is determined that the fracture is caused by FE, and the evaluation is performed again. The evaluation is repeated until FE is not observed and the bubbles are broken.

(6) Haze

The haze (unit: %) of the formed inflation film was measured according to ASTM 1003. As the haze becomes larger, the film is less easily to be wound (less likely to stick to each other). This indicates that the film is easy to handle.

(7) Thickness

The thickness (unit: μm) of the formed inflation film was measured according to JIS Z1702. The thicknesses around one circumference of the cylindrical film were measured at an interval of 2 cm in the direction perpendicular to the film take-up direction during film formation, and were averaged. A smaller measured value for the thickness contributes to film thinning of polyethylene. This indicates that polyethylene is excellent in stretch property.

EXAMPLES

Examples and Comparative Examples

Hereinafter, the invention will be described with reference to Examples and Comparative Examples.

Examples 1, 2, and 3 and Comparative Examples 1, 2, 3, and 4 (Examples and Comparative Examples in FIG. 1) in FIG. 1, the total supply amount of fresh ethylene compressed to a discharge pressure of the secondary compressor of 171.5 to 211.2 MPa (described in Table 2) is from 16.0 to 17.7 ton/h (described in Table 2). This fresh ethylene is supplied from piping 9 and goes through piping 10 to reach a temperature section 1 of a autoclave-type reactor 20, namely an upper portion of the autoclave-type reactor 20 at a fresh ethylene supply amount of 4.0 to 4.4 ton/h (described in Table 2). The fresh ethylene also goes through piping 11 to reach a temperature section 3 of the autoclave-type reactor 20, namely a lower portion of the autoclave-type reactor 20 at a fresh ethylene supply amount of 8.0 to 8.9 ton/h (described in Table 2). The top portion of a autoclave-type reactor 21 has a remainder fresh ethylene supply amount of 4.0 to 4.4 ton/h (described in Table 2). This fresh ethylene goes through piping 12 to be supplied to a temperature section 5 of the autoclave-type reactor 21.

The autoclave-type reactor 20 has a pressure of 155.1 to 197.3 MPa. The autoclave-type reactor 21 has a pressure of 134.6 to 177.1 MPa.

The inside of the autoclave-type reactor 20 has four temperature sections. From the top, temperature section 1, 2, 3, or 4 is present. Each temperature section has a thermometer inserted.

In addition, the inside of the autoclave-type reactor 21 has four temperature sections. From the top, temperature section 5, 6, 7, or 8 is present. Each temperature section has a thermometer inserted.

Here, t-butylperoxy-2-ethylhexanoate, which is a polymerization initiator, is supplied from piping 13 to the temperature section 1 of the autoclave-type reactor 20, namely an upper portion of the autoclave-type reactor 20 at a polymerization initiator supply amount of 3.5 to 5.1 kg/h (described in Table 2). Also, t-butylperoxy-2-ethylhexanoate, which is a polymerization initiator, is supplied from piping 14 to the temperature section 3 of the autoclave-type reactor 20, namely a lower portion of the autoclave-type reactor 20 at a polymerization initiator supply amount of 3.5 to 5.2 kg/h (described in Table 2).

Further, t-butylperoxy-2-ethylhexanoate, which is a polymerization initiator, is supplied from piping 15 to the temperature section 5 of the autoclave-type reactor 21, namely an upper portion of the autoclave-type reactor 21 at a polymerization initiator supply amount of 2.3 to 3.9 kg/h (described in Table 2). Furthermore, t-butylperoxy-2-ethylhexanoate, which is a polymerization initiator, is supplied from piping 16 to the temperature section 7 of the autoclave-type reactor 21, namely a lower portion of the autoclave-type reactor 21 at a polymerization initiator supply amount of 0.0 to 1.7 kg/h (described in Table 2).

The fresh ethylene supplied from the piping 10 and the polymerization initiator t-butylperoxy-2-ethylhexanoate supplied from the piping 13 to the temperature section 1 of the autoclave-type reactor 20 are used for polymerization of the ethylene to produce polyethylene. The polyethylene produced in the temperature section 1 and unreacted ethylene are transferred to the temperature section 2, so that the polymerization continues. The polyethylene produced in the temperature section 2 and unreacted ethylene are transferred to the temperature section 3.

The fresh ethylene is supplied from the piping 11 and the polymerization initiator t-butylperoxy-2-ethylhexanoate is supplied from the piping 14 to the temperature section 3. The ethylene polymerization continues to produce polyethylene. The polyethylene produced in the temperature section 3 and unreacted ethylene are transferred to the temperature section 4, so that the ethylene polymerization continues to further produce polyethylene.

The polyethylene produced in the temperature section 4 of the autoclave-type reactor 20 and unreacted ethylene are discharged from the bottom of the autoclave-type reactor 20. They pass through a pressure control valve 17, and are introduced into a heat exchanger 18, cooled with the heat exchanger 18, and then supplied to the temperature section 7 of the autoclave-type reactor 21.

The fresh ethylene supplied from the piping 12 and the polymerization initiator t-butylperoxy-2-ethylhexanoate supplied from the piping 15 to the temperature section 5 of the autoclave-type reactor 21 are used for polymerization of the ethylene to produce polyethylene.

The polyethylene produced in the temperature section 5 and unreacted ethylene are transferred to the temperature section 6, so that the polymerization continues. The polyethylene produced in the temperature section 6 and unreacted ethylene are transferred to the temperature section 7.

The polyethylene and unreacted ethylene discharged from the bottom of the autoclave-type reactor 20, passing through the pressure control valve 17, and introduced into and cooled with the heat exchanger 18 are supplied to the temperature section 7. In addition, the polymerization initiator t-butylperoxy-2-ethylhexanoate is further supplied from the piping 16. In this way, the ethylene polymerization continues to produce polyethylene. The polyethylene produced in the temperature section 7 and unreacted ethylene are transferred to the temperature section 8, so that the ethylene polymerization continues to further produce polyethylene.

The polyethylene produced in the temperature section 8 of the autoclave-type reactor 21 and unreacted ethylene are discharged from the bottom of the autoclave-type reactor 21, pass through a pressure control valve 19, and are introduced into a heat exchanger and a separator. Then, the produced polyethylene is separated through the separator from unreacted ethylene to finally obtain the produced polyethylene.

Table 2 shows production conditions for each of Examples 1 to 3 or Comparative Examples 1 to 4.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Discharge pressure [MPa] of secondary compressor | 174.6 | 174.1 | 174.1 | 171.5 | 188.7 | 211.2 | 186.9 |
| Fresh ethylene supply amount [ton/h] | 17.7 | 17.1 | 17.5 | 17.2 | 16.0 | 16.0 | 17.2 |
| Pressure [MPa] of autoclave-type reactor 20 | 165.2 | 165.0 | 165.2 | 155.1 | 175.0 | 197.3 | 178.4 |
| Pressure [MPa] of autoclave-type reactor 21 | 148.6 | 149.0 | 149.0 | 134.6 | 154.8 | 177.1 | 157.5 |
| Fresh ethylene supply amount [ton/h] at | 4.4 | 4.3 | 4.4 | 4.3 | 4.0 | 4.0 | 4.3 |

TABLE 2-continued

|  | Example 1 | Example 2 | Example 3 | Comparative Example 1 | Comparative Example 2 | Comparative Example 3 | Comparative Example 4 |
|---|---|---|---|---|---|---|---|
| an upper portion in the autoclave-type reactor 20 |  |  |  |  |  |  |  |
| Fresh ethylene supply amount [ton/h] at a lower portion in the autoclave-type reactor 20 | 8.9 | 8.6 | 8.7 | 8.6 | 8.0 | 8.0 | 8.6 |
| Fresh ethylene supply amount [ton/h] at an upper portion in the autoclave-type reactor 21 | 4.4 | 4.3 | 4.3 | 4.3 | 4.0 | 4.0 | 4.3 |
| Polymerization initiator supply amount [kg/h] at an upper portion of the autoclave-type reactor 20 | 4.6 | 5.1 | 4.9 | 3.5 | 3.8 | 4.8 | 4.3 |
| Polymerization initiator supply amount [kg/h] at a lower portion of the autoclave-type reactor 20 | 5.0 | 5.2 | 4.8 | 3.5 | 4.7 | 3.7 | 3.8 |
| Polymerization initiator supply amount [kg/h] at an upper portion of the autoclave-type reactor 21 | 2.7 | 2.3 | 2.4 | 3.2 | 3.0 | 3.9 | 3.2 |
| Polymerization initiator supply amount [kg/h] at a lower portion of the autoclave-type reactor 21 | 0.3 | 0.0 | 0.2 | 0.4 | 0.6 | 1.7 | 0.3 |

Table 3 indicates the temperature [° C.] of and the temperature difference ($\Delta T$) [° C.] between each temperature section in Example 1, 2, or 3.

TABLE 3

|  | Example 1 | | Example 2 | | Example 3 | |
|---|---|---|---|---|---|---|
| Temperature section | Temperature of temperature section [° C.] | Temperature difference ($\Delta T$) [° C.] | Temperature of temperature section [° C.] | Temperature difference ($\Delta T$) [° C.] | Temperature of temperature section [° C.] | Temperature difference ($\Delta T$) [° C.] |
| 1 | 227.9 | 7.2 | 228.8 | 5.8 | 227.9 | 6.1 |
| 2 | 235.1 |  | 234.6 |  | 234.0 |  |
| 3 | 227.9 | 6.7 | 227.1 | 6.9 | 225.4 | 7.6 |
| 4 | 234.6 |  | 234.9 |  | 233.0 |  |
| 5 | 215.9 | 3.5 | 201.7 | 6.1 | 204.2 | 5.2 |
| 6 | 219.4 |  | 207.8 |  | 209.4 |  |
| 7 | 213.6 | 4.6 | 206.9 | 2.2 | 203.2 | 4.9 |
| 8 | 218.2 |  | 208.2 |  | 208.1 |  |

Table 4 indicates the temperature [° C.] of and the temperature difference ($\Delta T$) [° C.] between each temperature section in Comparative Example 1, 2, 3, or 4.

TABLE 4

|  | Comparative Example 1 | | Comparative Example 2 | | Comparative Example 3 | | Comparative Example 4 | |
|---|---|---|---|---|---|---|---|---|
| Temperature section | Temperature of temperature section [° C.] | Temperature difference ($\Delta T$) [° C.] | Temperature of temperature section [° C.] | Temperature difference ($\Delta T$) [° C.] | Temperature of temperature section [° C.] | Temperature difference ($\Delta T$) [° C.] | Temperature of temperature section [° C.] | Temperature difference ($\Delta T$) [° C.] |
| 1 | 224.2 | 6..3 | 224.2 | 5.9 | 230.3 | 5.1 | 223.7 | 6.0 |
| 2 | 230.6 |  | 230.1 |  | 235.3 |  | 229.7 |  |
| 3 | 220.3 | 9.5 | 221.3 | 8.5 | 225.1 | 8.6 | 220.2 | 9.4 |
| 4 | 229.8 |  | 229.8 |  | 233.7 |  | 229.6 |  |
| 5 | 229.7 | 1.3 | 227.5 | 1.7 | 232.0 | 2.0 | 227.6 | 1.7 |
| 6 | 231.0 |  | 229.2 |  | 234.7 |  | 229.3 |  |
| 7 | 223.7 | 4.4 | 223.7 | 4.6 | 229.4 | 3.5 | 224.2 | 4.2 |
| 8 | 228.1 |  | 228.2 |  | 232.9 |  | 228.4 |  |

Examples 4 and 5 (Examples in FIG. 2)

In FIG. 2, the total supply amount of fresh ethylene compressed to a discharge pressure of the secondary compressor of 166.9 to 167.0 MPa (described in Table 5) is from 14.3 to 17.0 ton/h (described in Table 5). This fresh ethylene is supplied from piping 5 and goes through piping 6 to reach a temperature section 1 of a autoclave-type reactor 11, namely an upper portion of the autoclave-type reactor 11 at a fresh ethylene supply amount of 7.2 to 8.5 ton/h (described in Table 5). The fresh ethylene also goes through piping 7 to reach a temperature section 3 of the autoclave-type reactor 11, namely a lower portion of the autoclave-type reactor 11 at a fresh ethylene supply amount of 7.2 to 8.5 ton/h (described in Table 5).

The autoclave-type reactor 11 has a pressure of 164.2 MPa.

The inside of the autoclave-type reactor 11 has four temperature sections. From the top, temperature section 1, 2, 3, or 4 is present. Each temperature section has a thermometer inserted.

Here, t-butylperoxy-2-ethylhexanoate, which is a polymerization initiator, is supplied from piping 8 to the temperature section 1 of the autoclave-type reactor 11, namely an upper portion of the autoclave-type reactor 11 at a polymerization initiator supply amount of 3.7 to 3.9 kg/h (described in Table 5). Further, t-butylperoxy-2-ethylhexanoate, which is a polymerization initiator, is supplied from piping 9 to the temperature section 3 of the autoclave-type reactor 11, namely a lower portion of the autoclave-type reactor 11 at a polymerization initiator supply amount of 2.2 to 2.6 kg/h (described in Table 5).

The fresh ethylene supplied from the piping 6 and the polymerization initiator t-butylperoxy-2-ethylhexanoate supplied from the piping 8 to the temperature section 1 of the autoclave-type reactor 11 are used for polymerization of the ethylene to produce polyethylene. The polyethylene produced in the temperature section 1 and unreacted ethylene are transferred to the temperature section 2, so that the polymerization continues. The polyethylene produced in the temperature section 2 and unreacted ethylene are transferred to the temperature section 3. The fresh ethylene is supplied from the piping 7 and the polymerization initiator t-butylperoxy-2-ethylhexanoate is supplied from the piping 9 to the temperature section 3. The ethylene polymerization continues to produce polyethylene. The polyethylene produced in the temperature section 3 and unreacted ethylene are transferred to the temperature section 4, so that the ethylene polymerization continues to further produce polyethylene.

The polyethylene produced in the temperature section 4 of the autoclave-type reactor 11 and unreacted ethylene are discharged from the bottom of the autoclave-type reactor 11, pass through a pressure control valve 10, and are introduced into a heat exchanger and a separator. Then, the produced polyethylene is separated through the separator from unreacted ethylene to finally obtain the produced polyethylene.

Table 5 shows the production conditions for Example 4 or 5.

TABLE 5

|  | Example 4 | Example 5 |
|---|---|---|
| Discharge pressure [MPa] of secondary compressor | 166.9 | 167.0 |
| Fresh ethylene supply amount [ton/h] | 14.3 | 17.0 |
| Pressure [MPa] of autoclave-type reactor 11 | 164.2 | 164.2 |
| Fresh ethylene supply amount [ton/h] at an upper portion in the autoclave-type reactor 11 | 7.2 | 3.5 |
| Fresh ethylene supply amount [ton/h] at a lower portion in the autoclave-type reactor 11 | 7.2 | 3.5 |
| Polymerization initiator supply amount [kg/h] at an upper portion of the autoclave-type reactor 11 | 3.7 | 3.9 |
| Polymerization initiator supply amount [kg/h] at a lower portion of the autoclave-type reactor 11 | 2.2 | 2.6 |

Table 6 indicates the temperature [° C.] of and the temperature difference ($\Delta T$) [° C.] between each temperature section in Example 4 or 5.

TABLE 6

| | Example 4 | | Example 5 | |
|---|---|---|---|---|
| Temperature section | Temperature of temperature section [° C.] | Temperature difference ($\Delta T$) [° C.] | Temperature of temperature section [° C.] | Temperature difference ($\Delta T$) [° C.] |
| 1 | 228.0 | 4.6 | 226.2 | 6.2 |
| 2 | 232.6 |  | 232.4 |  |
| 3 | 227.3 | 3.7 | 225.6 | 5.2 |
| 4 | 230.9 |  | 230.8 |  |

Table 1 shows the values for physical properties of polyethylene produced in each of Examples 1 to 5 or Comparative Examples 1 to 4.

TABLE 1

| | MFR [g/10 min] | Density [kg/m³] | Light scattering area Ratio $R_{LS}$ | $W_{Log10M>5.25}$ [wt %] | $W_{Log10M>5.25}/R_{LS}$ | Thickness [µm] | Haze [%] | Take-up speed during film formation * |
|---|---|---|---|---|---|---|---|---|
| Example 1 | 3.6 | 923 | 3.0 | 17.3 | 5.8 | 23.7 | 30.4 | 23.0 |
| Example 2 | 3.7 | 923 | 2.5 | 16.6 | 6.6 | 22.8 | 27.8 | 24.0 |
| Example 3 | 3.7 | 923 | 2.5 | 15.8 | 6.3 | 21.6 | 26.7 | 24.5 |
| Comparative Example 1 | 3.9 | 924 | 3.4 | 18.9 | 5.6 | 29.5 | 34.2 | 18.5 |
| Comparative Example 2 | 3.4 | 923 | 2.6 | 17.6 | 6.3 | 26.9 | 29.5 | 19.5 |

TABLE 1-continued

| | MFR [g/10 min] | Density [kg/m³] | Light scattering area Ratio $R_{LS}$ | $W_{Log10M>5.25}$ [wt %] | $W_{Log10M>5.25}/R_{LS}$ | Thickness [μm] | Haze [%] | Take-up speed during film formation * |
|---|---|---|---|---|---|---|---|---|
| Comparative Example 3 | 3.3 | 924 | 2.4 | 16.9 | 7.0 | 23.4 | 21.5 | 22.5 |
| Comparative Example 4 | 3.8 | 924 | 2.5 | 17.3 | 6.9 | 24.9 | 24.2 | 22.0 |
| Example 4 | 3.7 | 923 | 2.5 | 16.7 | 6.7 | 22.6 | 28.9 | 24.0 |
| Example 5 | 3.5 | 924 | 2.5 | 16.6 | 6.6 | 23.3 | 30.7 | 23.5 |

* Maximum take-up speed that was able to be kept for 5 min. When the speed was further increased by 0.5 m/min, the molten film was broken within 5 min.

TABLE 1A

| | Haze [%]/Thickness [μm] |
|---|---|
| Example 1 | 1.28 |
| Example 2 | 1.22 |
| Example 3 | 1.24 |
| Comparative Example 1 | 1.16 |
| Comparative Example 2 | 1.10 |
| Comparative Example 3 | 0.92 |
| Comparative Example 4 | 0.97 |
| Example 4 | 1.28 |
| Example 5 | 1.32 |

As the haze become larger, the film is indicated to be more easily handled. The smaller the thickness (i.e., as the reciprocal of the thickness (1/thickness) increases), the better the stretch property. This means that the larger the "haze/thickness", the better the balance between film thinning (stretch property) and handleability (haze of the film). As shown in Table 1A, in Examples 1 to 5, the "haze/thickness" is 1.2 or more. By contrast, the "haze/thickness" is less than 1.2 in Comparative Examples 1 to 4. Examples 1 to 5 have been found to have a better balance between film thinning (stretch property) and handleability (haze of the film) than Comparative Examples 1 to 4.

According to the invention, the temperature difference between each reaction zone inside the reactor is suitably controlled. This makes it possible to produce polyethylene with further improved film thinning and handleability.

In the invention, the ratio of ultra-high molecular weight component to medium to high molecular weight component of polyethylene is set to a specific range. This makes it possible to produce polyethylene having a further improved balance between film thinning (stretch property) and handleability (unevenness of the film surface, for example, haze of the film).

Polyethylene produced by the production process or apparatus of the invention is applicable to a wide variety of films such as heavy bags, shrink bags, general packaging, thin films, protective films (protection films), extrusion laminated films, extrusion molded films, and foam molded films. The polyethylene is suitably used for applications such as various parts of home electric appliances, various housing equipment components, various industrial components, various building material components, and various automobile interior and exterior parts. The invention is thus highly applicable to various fields of industries such as electrical and electronic industry, household goods, transportation machine industry, and building and construction industry.

What is claimed is:

1. A process for producing polyethylene, comprising subjecting high-pressure ethylene to polymerization using an autoclave-type reactor in presence of a polymerization initiator, wherein
   the autoclave-type reactor has a reaction zone with at least two different temperature sections;
   the polymerization initiator and the ethylene are supplied to the temperature section positioned upstream in the reaction zone of the autoclave-type reactor and the ethylene is polymerized to generate polyethylene;
   unreacted ethylene and the polyethylene generated at the upstream temperature section in the autoclave-type reactor flow into the temperature section positioned downstream and in communication with the upstream temperature section in the reaction zone of the reactor, so that additional polyethylene is generated at the downstream temperature section; and
   a difference ($\Delta$T [° C.]) between a temperature (T1 [° C.]) of the temperature section positioned upstream and a temperature (T2 [° C.]) of the temperature section positioned downstream in the reaction zone that receives the polymerization initiator and is in the autoclave-type reactor is 2.1° C. or more and 8.4° C. or less.

2. The production process according to claim 1, wherein two or more reaction zones are present.

3. The production process according to claim 1, wherein $\Delta$T [° C.]=T2 [° C.]−T1 [° C.].

4. The production process according to claim 1, wherein the polyethylene to be produced is the following polyethylene:
   having a ratio ($W_{Log\ 10M>5.25}/R_{LS}$) of a weight fraction ($W_{Log\ 10M>5.25}$: represented in wt %) of a component with $Log_{10}$ M of more than 5.25 in an integral distribution curve of polyethylene evaluated by gel permeation chromatography, where M represents a molecular weight in terms of polyethylene, to
   a light scattering area ratio ($R_{LS}$) of 5.7 or more and 6.7 or less, the light scattering area ratio represented by the following formula 1:

$R_{LS}=LS/LS'$ (formula 1)

wherein LS denotes a light scattering area of a solution prepared by dissolving 40 mg of the polyethylene into 20 mL of o-dichlorobenzene, and
   LS' denotes a light scattering area of a solution prepared by dissolving 40 mg of standard polystyrene with a number average molecular weight of 1000 into 20 mL of o-dichlorobenzene.

* * * * *